(12) United States Patent
Schell et al.

(10) Patent No.: US 10,654,125 B2
(45) Date of Patent: May 19, 2020

(54) INTEGRATED GAS PURGE PATH FOR WELDED SANDWICH STRUCTURE

(71) Applicant: The Boeing Company, Chicago, IL (US)

(72) Inventors: William R. Schell, Edgewood, WA (US); Edward O. Jorgenson, Auburn, WA (US); Jack W. Mauldin, Mill Creek, WA (US); Mark D. Gilcreest, Kent, WA (US); Benjamin S. Northup, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1128 days.

(21) Appl. No.: 15/047,073

(22) Filed: Feb. 18, 2016

(65) Prior Publication Data

US 2017/0241577 A1    Aug. 24, 2017

(51) Int. Cl.
*B23K 20/26* (2006.01)
*B23K 20/02* (2006.01)
*B23K 101/04* (2006.01)

(52) U.S. Cl.
CPC .............. *B23K 20/26* (2013.01); *B23K 20/02* (2013.01); *B23K 2101/045* (2018.08)

(58) Field of Classification Search
CPC .. B23K 20/02; B23K 20/26; B23K 2101/045; B23K 9/167; B23K 9/173; B23K 9/325
See application file for complete search history.

(56) References Cited

U.S. PATENT DOCUMENTS 5,981,897 A * 11/1999 Offer ...................... B23K 9/164
219/136

* cited by examiner

*Primary Examiner* — Daniel J Wiley
(74) *Attorney, Agent, or Firm* — Miller Matthias & Hull LLP

(57) ABSTRACT

A method of forming a weld on a work piece is disclosed. The method may include creating an internal cavity along the work piece and extending a conduit having an exit orifice into the internal cavity such that the exit orifice may be positioned adjacent to the weld to be formed. The method may further include supplying a purge gas to the conduit, the purge gas being carried through the conduit and pushed out of the exit orifice so as to displace undesirable gasses away from the weld to be formed and then subsequently forming the weld.

20 Claims, 8 Drawing Sheets

INTEGRATED GAS PURGE PATH FOR WELDED SANDWICH STRUCTURE

FIELD

The present disclosure relates generally to a sandwich panel assembly, and more specifically the use of a gas purge path for distributing a gas flow along a weld joint.

BACKGROUND

The manufacture of metallic sandwich structures may require joining one or more sandwich panels together in order to form the desired sandwich structure. During the fabrication process, fusion welding is one method that may be used to securely join sandwich panels together. During fusion welding of the weld joint it is extremely important that the molten and solidifying weld pool and adjoining heat-affected zone are properly shielded in an inert gas to prevent reaction with air and other non-inert or reactive material. In many welded structure designs, adequate access to both sides of the weld joint may allow for a sufficient delivery of purge gas before, during and after the welding process. However, structures incorporating sandwich panels may have internal cell structures that provide limited access to the front and/or back side of the weld joint. This limited access may make it increasingly difficult to properly purge the weld joint area and inspect weld quality.

SUMMARY

In accordance with one aspect of the present disclosure, a method of forming a weld on a work piece is described. The method may include forming an internal cavity along the work piece and extending a conduit having an exit orifice into the internal cavity such that the exit orifice may be positioned adjacent to the weld being formed. The method may further include supplying a purge gas to the conduit, the purge gas being carried through the conduit and pushed out of the exit orifice so as to displace undesirable gasses away from the weldment to be formed and then subsequently forming the weld.

In a refinement, the method may include positioning a first joint member relative to a second joint member on the work piece so that a first attachment point of the first joint member may be aligned with a first attachment point of the second joint member along a first attachment line and a second attachment point of the first joint member may be aligned with a second attachment point of the second joint member along a second attachment line. The refinement may further include forming an internal channel within the first and second joint members and aligning the first and second attachment lines with the internal channel and the conduit, and forming the weld between the first and second attachment lines.

In another refinement, the first joint member may further comprise a first sandwich panel having a first face sheet defining the first attachment point of the first joint member, a second face sheet defining the second attachment point of the first joint member, and an internal cell structure connecting the first face sheet to the second face sheet. Furthermore, the second joint member may comprise a second sandwich panel having a first face sheet defining the first attachment point of the second joint member, a second face sheet defining the second attachment point of the second joint member, and an internal cell structure connecting the first face sheet to the second face sheet.

In another refinement, the exit orifice of the conduit may be configured as a plurality of perforations formed along the length of the conduit.

In another refinement, the internal channel may follow a contoured path, and the conduit may be formed of a flexible material configured to follow the contoured path.

In another refinement, supplying the purge gas may comprise continuously supplying the purge gas during welding.

In another refinement, the method may further include withdrawing the conduit from the internal channel after welding, and inserting an inspection device into the internal channel. Furthermore, the inspection device may be configured to inspect the weld quality along the first and second attachment lines.

In another refinement, the first joint member may be one of a SPF/DB structure, a honeycomb structure, or an end fitting and the second joint member may be one of a SPF/DB structure, a honeycomb structure, or an end fitting.

In another refinement, the method may include forming the internal channel by trimming a web of at least one of the first and second joint members.

In accordance with another aspect of the present disclosure, a weld joint assembly for use with a purge gas conduit is described. The assembly may include a first joint member having spaced first and second attachment points joined by a web and the second joint member being sized so that the first attachment points of the first and second joint members may be aligned along a first attachment line, and the second attachments points of the first and second joint members may be aligned along a second attachment line. The method may further include, the first and second joint members defining an internal channel disposed between, and in direct fluid communication with, the first and second attachment lines, the internal channel extending along entire lengths of the first and second attachment lines, and being sized to receive the purge gas conduit.

In another refinement, the first joint member may comprise a first sandwich panel having a first face sheet defining the first attachment point of the first joint member, a second face sheet defining the second attachment point of the first joint member, and an internal cell structure defining the web of the first joint member. Furthermore, the second joint member may comprise a second sandwich panel having a first face sheet defining the first attachment point of the second joint member, a second face sheet defining the second attachment point of the second joint member and an internal cell structure defining the web of the second joint member.

In another refinement, the internal channel may follow a contoured path and the purge gas conduit may be formed of a flexible material configured to follow the contoured path.

In another refinement, the first joint member may be one of a SPF/DB structure, a honeycomb structure, or an end fitting and the second joint member may be one of a SPF/DB structure, a honeycomb structure, or an end fitting.

In accordance with another aspect of the present disclosure, a weld joint assembly is described. The weld joint assembly may include, a first joint member including spaced first and second attachment points joined by a first web and a second joint member including spaced first and second attachment points joined by a second web, the second joint member being sized so that the first attachment points of the first and second joint members are aligned along a first attachment line, and the second attachment points of the first and second joint members are aligned along a second attachment line. Moreover, the first and second joint members may define an internal channel disposed between, and in direct fluid communication with, the first and second attachment lines, the internal channel extending along entire lengths of the first and second attachment lines and a purge gas conduit sized for insertion into the internal channel.

In another refinement, the first joint member may comprise a first sandwich panel having a first face sheet defining the first attachment point of the first joint member, a second face sheet defining the second attachment point of the first joint member, and an internal cell structure defining the first web of the first joint member. Furthermore, the second joint member comprises a second sandwich panel having a first face sheet defining the first attachment point of the second joint member, a second face sheet defining the second attachment point of the second joint member, and an internal cell structure defining the second web of the second joint member.

In another refinement, the first joint member may be welded to the second joint member along the first and second attachment lines.

In another refinement, the purge gas conduit may be configured to continuously supply the purge gas during welding and may have a plurality of perforations configured to direct the purge gas towards an area adjacent to the first and second attachment lines prior to and during welding.

In another refinement, the internal channel may follow a contoured path and the purge gas conduit may be formed of a flexible material configured to follow the contoured path.

In another refinement, the purge gas conduit may be withdrawn from the internal channel after welding, and an inspection device may be inserted into the internal channel, the inspection device being configured to inspect the weld quality along the first and second attachment lines.

In another refinement, the first joint member may be one of a SPF/DB structure, a honeycomb structure, or an end fitting, the second joint member may be one of a SPF/DB structure, a honeycomb structure or an end fitting and the internal channel may be formed by trimming at least one of the first and second webs.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both apparatus and methods for carrying out the disclosure. Actual scope of the disclosure is as defined by the appended claims.

Figure 1:
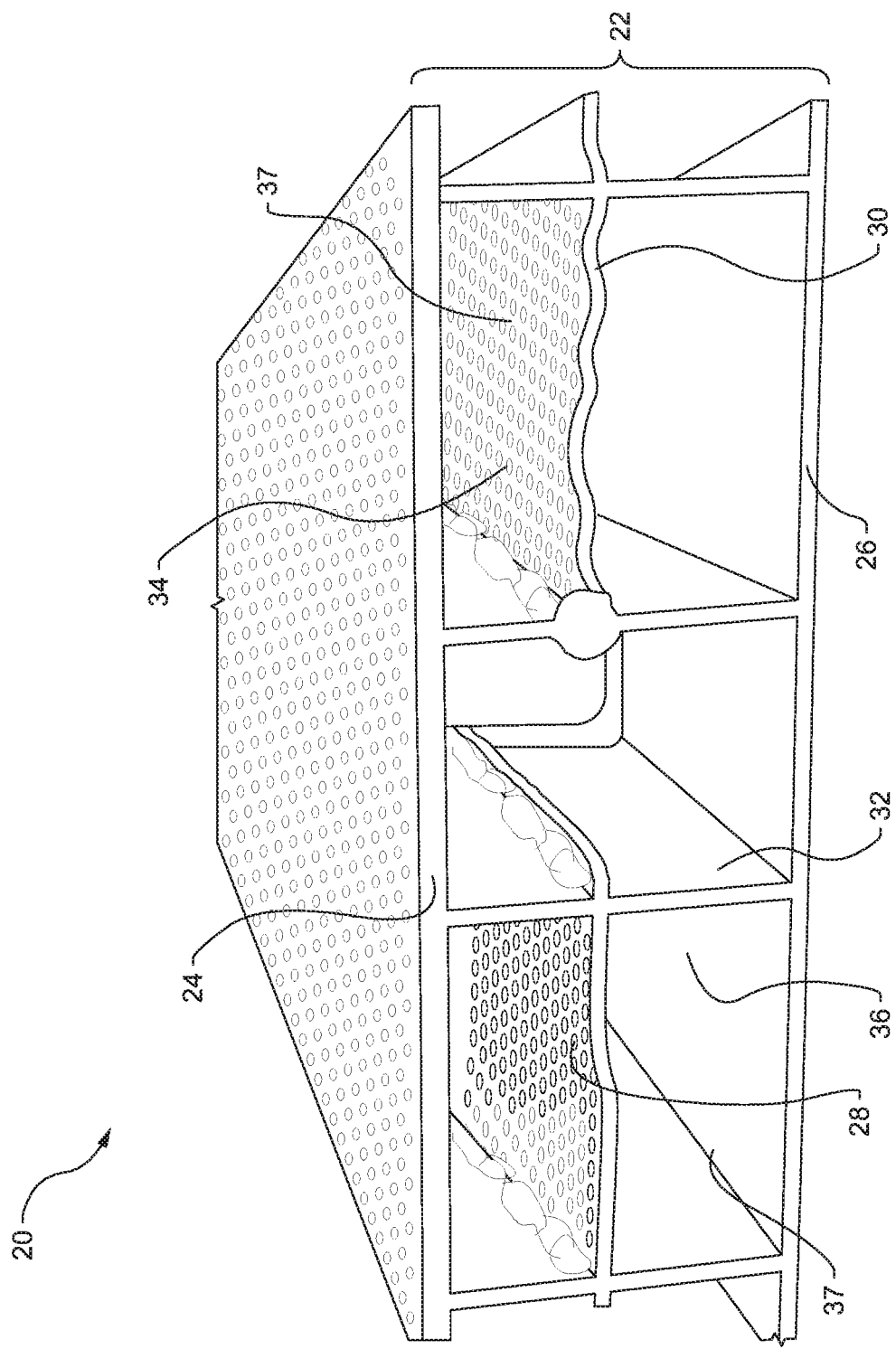
FIG. 1 is a perspective view of a sandwich panel constructed in accordance with the present disclosure.

In FIG. 1, a sandwich panel structure 20 is illustrated that includes a fabricated superplastic formed and diffusion bonded (SPF/DB) structure 22. In some embodiments, the SPF/DB structure 22 may have a first face sheet 24, a second face sheet 26 and a core 28 that is disposed between the first and second face sheets 24, 26. Moreover, the core 28 may include a septum 30 and a plurality of webs 32 and the septum 30 may be configured to be substantially perpendicular to the plurality of webs 32 to form a plurality of cells 34, 36. In one non-limiting example, the plurality of cells 34, 36 may be rectangular in shape, however other shapes for the cells are possible. Furthermore, the cells 34, 36 may be defined as upper cells 34 and lower cells 36. The upper cells 34 may be characterized by an open area 37 formed by the first face sheet 24, the septum 30 and the plurality of webs 32. Likewise, the lower cells 36 may be defined by an open area 37 formed by the second face sheet 26, the septum 30 and the plurality of webs 32.

For purposes of this disclosure, SPF/DB generally refers to a sandwich panel structure that is fabricated by a process in which heat may be used to superplastically form (SPF) a material beyond its plastic deformation limits. In some examples, materials such as, titanium, titanium alloys, aluminum, aluminum alloys, metal-matrix composites and other known materials, may exhibit superplastic properties which allow the material to be elongated, or otherwise shaped and formed, to over 100 percent of its original size. Furthermore, diffusion bonding typically refers to a process of fusing or fixedly attaching together, two or more materials using high temperature and pressure in order to create a solid-state diffusion between the materials to be attached. Diffusion bonding generally occurs at a temperature below the melting point of materials and an intermingling of materials may be achieved through the use of pressure. As a result, the individual materials may inter-diffuse with each other to bond the materials together.

Figure 2:
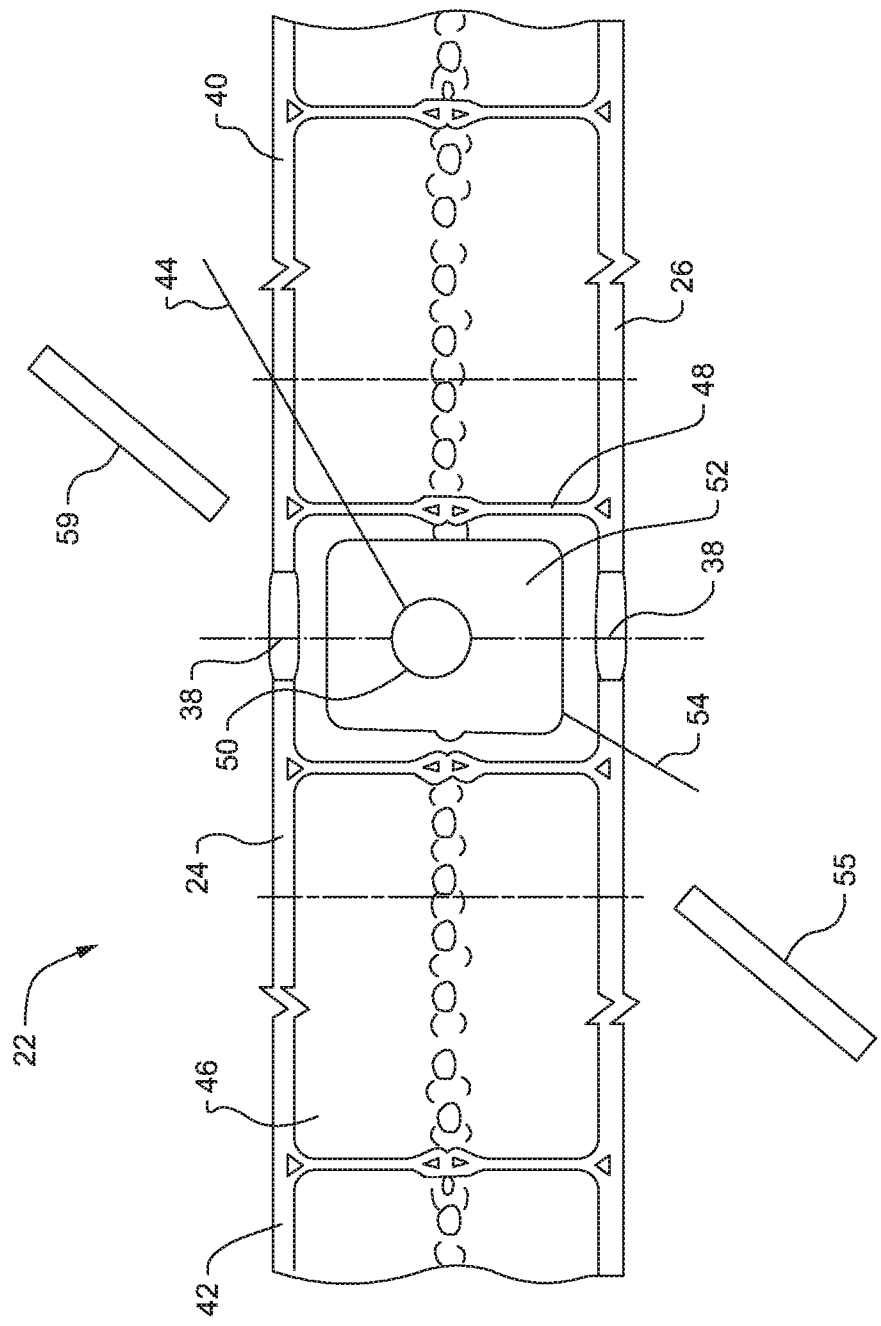
FIG. 2 is a cross-sectional view of an SPF/DB structure in accordance with the present disclosure.

Moving on to FIG. 2, one non-limiting example of a SPF/DB structure 22 formed by joining two SPF/DB panels 40, 42 is illustrated. The SPF/DB structure 22 may be formed by bonding or welding a first SPF/DB panel 40 together with a second SPF/DB panel 42 along the weld joint 38. While first and second SPF/DB panels 40, 42 are provided for this illustration, it will be appreciated that a greater number of SPF/DB panels may be used in the SPF/DB structure 22 fabrication. In some embodiments, the SPF/DB first and second panels 40, 42 may be composed of titanium, titanium alloy or other known SPF material and the first and second SPF/DB panels 40, 42 may be joined together using a fusion welding process.

Furthermore, the first and second SPF/DB panels 40, 42 may include a first face sheet 24 and second face sheet 26, one or more transverse webs 46, and one or more longitudinal webs 48. The one or more transverse webs 46 and the one or more longitudinal webs 48 may be disposed between the first and second face sheets 24, 26 and configured to form a core 28 of the SPF/DB panels 40, 42. Moreover, the first and second SPF/DB panels 40, 42 may be joined together by welding, or other known joining technique, along the weld joint 38. Additionally, in some embodiments a purge conduit path 50 may be formed within the core 28 of the SPF/DB structure 22 and positioned adjacent to the weld joint 38. The purge conduit path 50 may be configured to accept the purge gas conduit 44 and position the purge gas conduit 44 to adjacently run along the weld joint 38 and root face or hidden back side welds 52 that are formed during the joining and/or welding of the first and second SPF/DB panels 40, 42. In some embodiments, the purge gas conduit 44 may be shaped like a tube, however other configurations are possible.

During the welding process, an inert purge gas, such as argon, helium, other inert gas or mixture thereof, may be supplied to the weld joint 38 through the purge gas conduit 44 in order to provide protection against the formation of oxide along the weld during the welding process. In some embodiments, the purge gas conduit 44 may be needed to deliver the inert purge gas to the weld joint 38 because titanium, titanium alloy, and other metals may readily react with non-inert and reactive gases, such as oxygen and other contaminants, to form oxide or other weld defects. More specifically, oxide formation may be observable in a welding environment having non-inert and reactive gases present with levels as low as 10 parts per million (ppm). The oxide formation may be observable as a discoloration present along the titanium welds. The formation of oxide may initially appear as a light straw color, however, oxide will continue to form as the non-inert and reactive gas and/or other contaminant levels increase. Once non-inert and reactive gas levels reach a level of 50 ppm, the oxide formation may become detrimental to the material properties and overall integrity of the weld. As a result, to ensure the quality and maintain the integrity of the newly formed weld, it is advantageous to properly purge the weld joint 38 and surrounding areas before, during and after weld formation.

As further illustrated in FIG. 2, in order to provide a pathway for the purge gas conduit 44, a portion of the longitudinal web 48 may be trimmed to form a trimmed web portion 54. As a result, the purge conduit path 50 may be machined or otherwise formed through the trimmed web portion 54 of the one or more SPF/DB panels 40, 42. Moreover, the purge conduit path 50 may be configured to temporarily accept the purge gas conduit 44 such that the purge gas conduit 44 is inserted prior to the welding of the first and second SPF/DB panels 40, 42 and then removed from the purge conduit path 50 upon weld completion. Following the weld formation and removal of the purge gas conduit 44, a borescope 55 or other inspection device may be inserted into the purge conduit path 50 to inspect the quality of the completed weld. In some embodiments, the purge conduit path 50 may be plugged or otherwise covered when access is no longer needed by the purge gas conduit 44 and/or borescope 55. Alternatively, the purge conduit path 50 may be left open following removal of the purge gas conduit 44 and/or the borescope 55.

Figure 3:
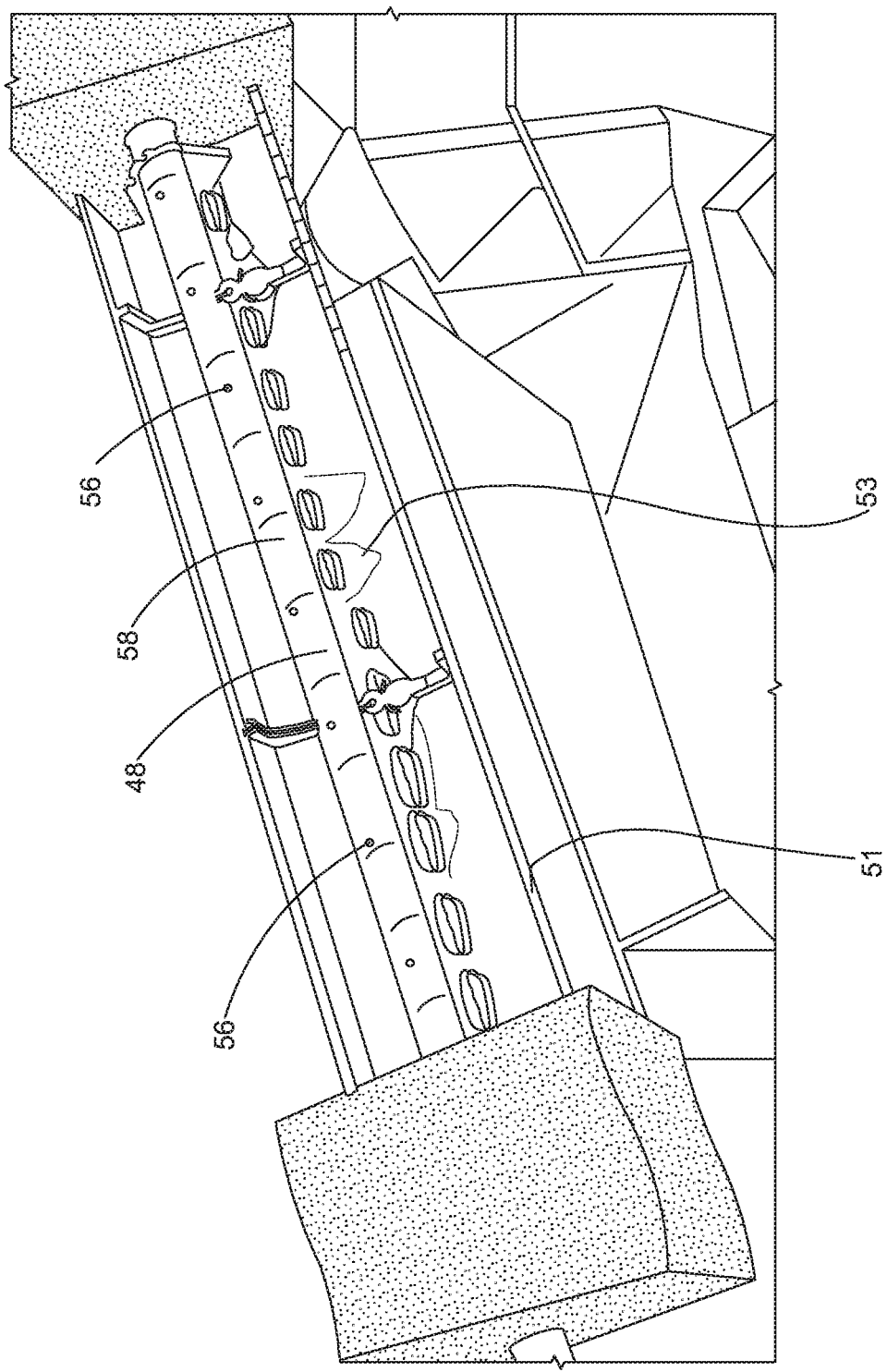
FIG. 3 is a perspective view of a purge gas conduit constructed in accordance with the present disclosure.

FIG. 3 provides an illustration of one non-limiting example of a work piece 51 having an internal cavity 53 to accommodate the purge gas conduit 44. The purge gas conduit 44 may be sized accordingly to fit within the purge conduit path 50 that is machined or otherwise formed within SPF/DB panels 40, 42. Furthermore, the purge gas conduit 44 may be constructed out of stainless steel or other suitable material and configured to have one or more purge gas conduit holes 56 formed along a sidewall 58 of the purge gas conduit 44. As illustrated in FIG. 3, the purge gas conduit 44 may have a series of purge gas conduit holes 56 along the sidewall 58. In some embodiments, the purge gas conduit holes 56 may be uniformly spaced down the length of the purge gas conduit 44, however other arrangements of the purge gas conduit holes 56 are possible. For example, the purge gas conduit holes 56 may be placed through the sidewall 58 and an opposing sidewall, with the plurality of purge gas conduit holes 56 made in the sidewall 58 and arranged in to be in direct alignment with the plurality of purge gas conduit holes 56 made in the opposing sidewall. Alternatively or additionally, the plurality of purge gas conduit holes 56 in the sidewall 58 may be offset with the plurality of purge gas conduit holes 56 in the opposing sidewall, however other configurations are possible. Additionally, the purge gas conduit 44 may be constructed out of a flexible or semi-flexible material. In some embodiments, the purge gas conduit 44 may be required to follow a contour or a plurality of contours that are formed into the first and second SPF/DB panels 40, 42 and or the SPF/DB structure 22. As a result, using a flexible or semi-flexible material for construction of the purge gas conduit 44 may allow the conduit 44 to follow the contour or plurality of contours formed into the SPF/DB structure 22.

The purge gas conduit 44 may be designed to provide an immediate and continuous flow of inert gas, such as argon, helium, other suitable gas or combination thereof, to the weld joint 38 and hidden backside welds 52 during the welding process. As discussed above, the purge gas may be required to displace the non-inert and/or reactive environment, and more specifically oxygen and other non-inert and/or reactive gases, from the area surrounding the weld joint 38 and the hidden backside welds 52 during the welding process. This is largely due to titanium and other materials being very sensitive to, and reactive with the presence of non-inert and/or reactive gases and other contaminants during the welding process. In some situations, welding in the presence of non-inert and/or reactive gases, such as oxygen, even at levels as low as 10 ppm, may facilitate oxide formation and compromise the weld quality. Accordingly, in some embodiments the purge gas conduit 44 may incorporate a sensor 59 that may be used to validate the effectiveness of the purge gas displacement of non-inert and/or reactive gases, such as oxygen and other contaminants, from the area surrounding the weld joint 38 and hidden backside welds 52. In some embodiments, the sensor 59 may be configured to detect oxygen and other non-inert and/or reactive gas levels as low as 5 ppm in order to ensure the welds are formed in the proper environment, however other detection limits or set points may be used.

Figure 4:
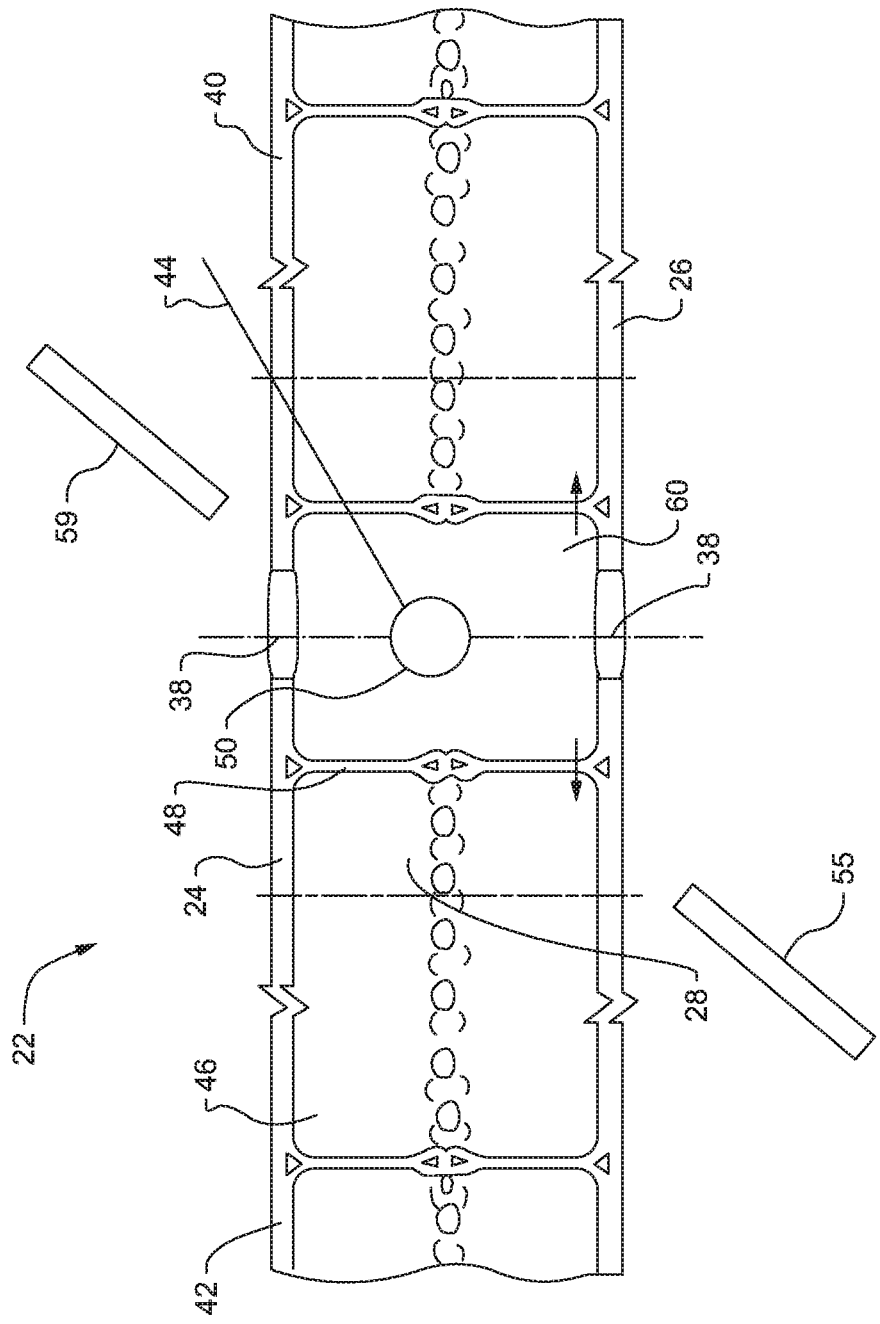
FIG. 4 is a cross-sectional view of an alternative embodiment of a SPF/DB structure in accordance with the present disclosure.

Moving on to FIG. 4, an SPF/DB 22 structure with an alternative embodiment of the construction and placement of the purge conduit path 50 and purge gas conduit 44 is illustrated. As illustrated in FIG. 2, the SPF/DB structure 22 may be formed by first and second SPF/DB panels 40, 42. In some embodiments, the SPF/DB panels 40, 42 may be configured to have a first and second face sheet 24, 26, one or more transverse webs 46 and one or more longitudinal webs 48. The one or more transverse webs 46 and longitudinal webs 48 may be disposed in between the first and second face sheets 24, 26 to define a core 28 of the SPF/DB panels 40, 42. Moreover, the one or more SPF/DB panels 40, 42 may be joined together by welding or other known joining technique along a weld joint 38. In some embodiments, a purge conduit path 50 may be formed within the SPF/DB structure 22 and positioned adjacent to the weld joint 38. Moreover, the purge conduit path 50 may be configured to accept the purge gas conduit 44 and position the purge gas conduit 44 to run along the entire length of the weld joint 38 and hidden back side or root face welds 52 that are formed during the joining and/or welding of the one or more SPF/DB panels 40, 42. In some embodiments, the transverse web 46 of SPF/DB panels 40, 42 may be terminated at the longitudinal webs 48 that are positioned adjacent to and lateral to the position of the purge conduit path 50. As a result, an area 60 is formed within the core 28 of the SPF/DB structure 22, which is essentially free of any portion of the transverse web 46, and the area 60 may be further configured to house the purge gas conduit 44 and purge conduit path 50. As illustrated by the arrows in FIG. 4, it may be advantageous to terminate the transverse web 46 at the longitudinal webs 48 on either side of the gas purge conduit 44 and gas purge conduit path 50 because doing so may shift the operating load peak stress away from the weld joint 38.

Figure 5:
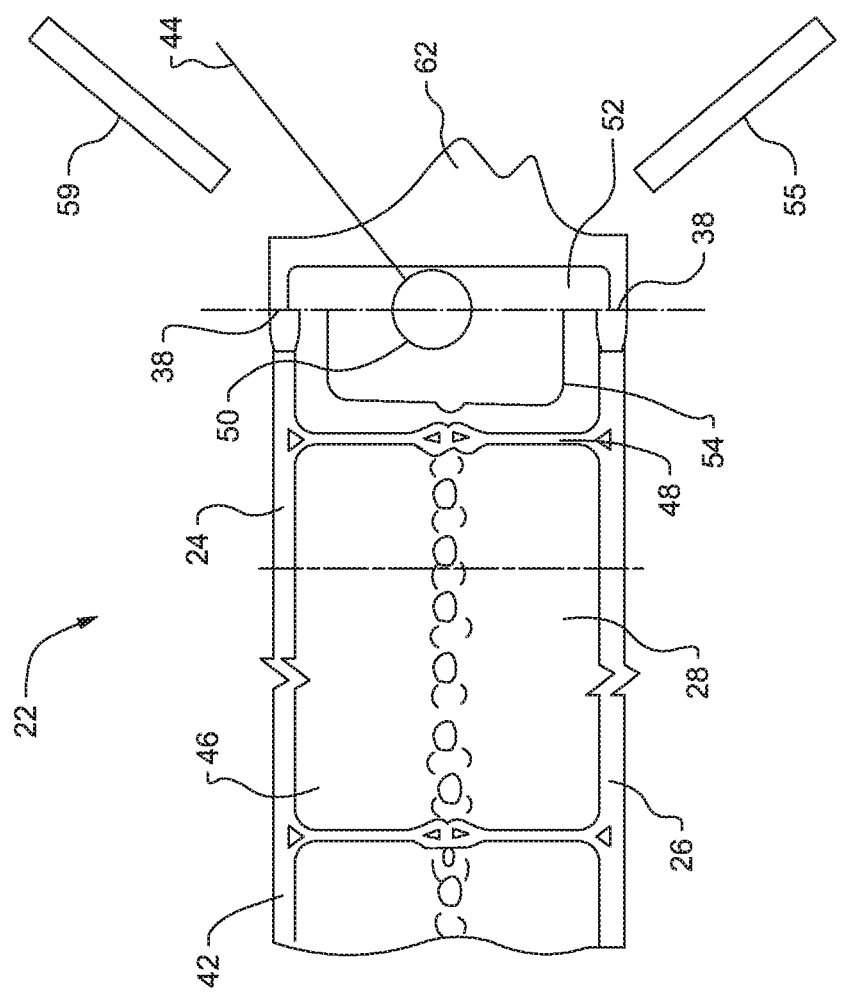
FIG. 5 is a cross-sectional of another embodiment of a SPF/DB structure in accordance with the present disclosure.

Furthermore as illustrated in FIG. 5, a SPF/DB structure 22 may be formed by joining at least one SPF/DB panel 42 with an end fitting 62. The SPF/DB panel 42 and the end fitting 62 may be welded, or otherwise joined together, along the weld joint 38. Moreover, the SPF/DB panel 42 may be constructed such that it has a first and second face sheet 24, 26, one or more transverse webs 46 and one or more longitudinal webs 48. As discussed above, the one or more transverse webs 46 and longitudinal webs 48 may be disposed in between the first and second face sheets 24, 26 to define a core 28 of the SPF/DB panels 42. In some embodiments, the SPF/DB panel may have a trimmed web portion 54 that removes part of the transverse web 46 from the area surrounding the purge conduit path 50 and the purge gas conduit 44. Alternatively, as illustrated in FIG. 4, the transverse web 46 may be completely removed from the area 60 such that there is no transverse web 46 present in the area surrounding the purge conduit path 50 and the purge gas conduit 44. As a result, in such a configuration the purge gas conduit 44 is configured to run along the weld joint 38 and hidden backside welds that may be formed during the welding of the SPF/DB panel 42 to the end fitting.

Figure 6:
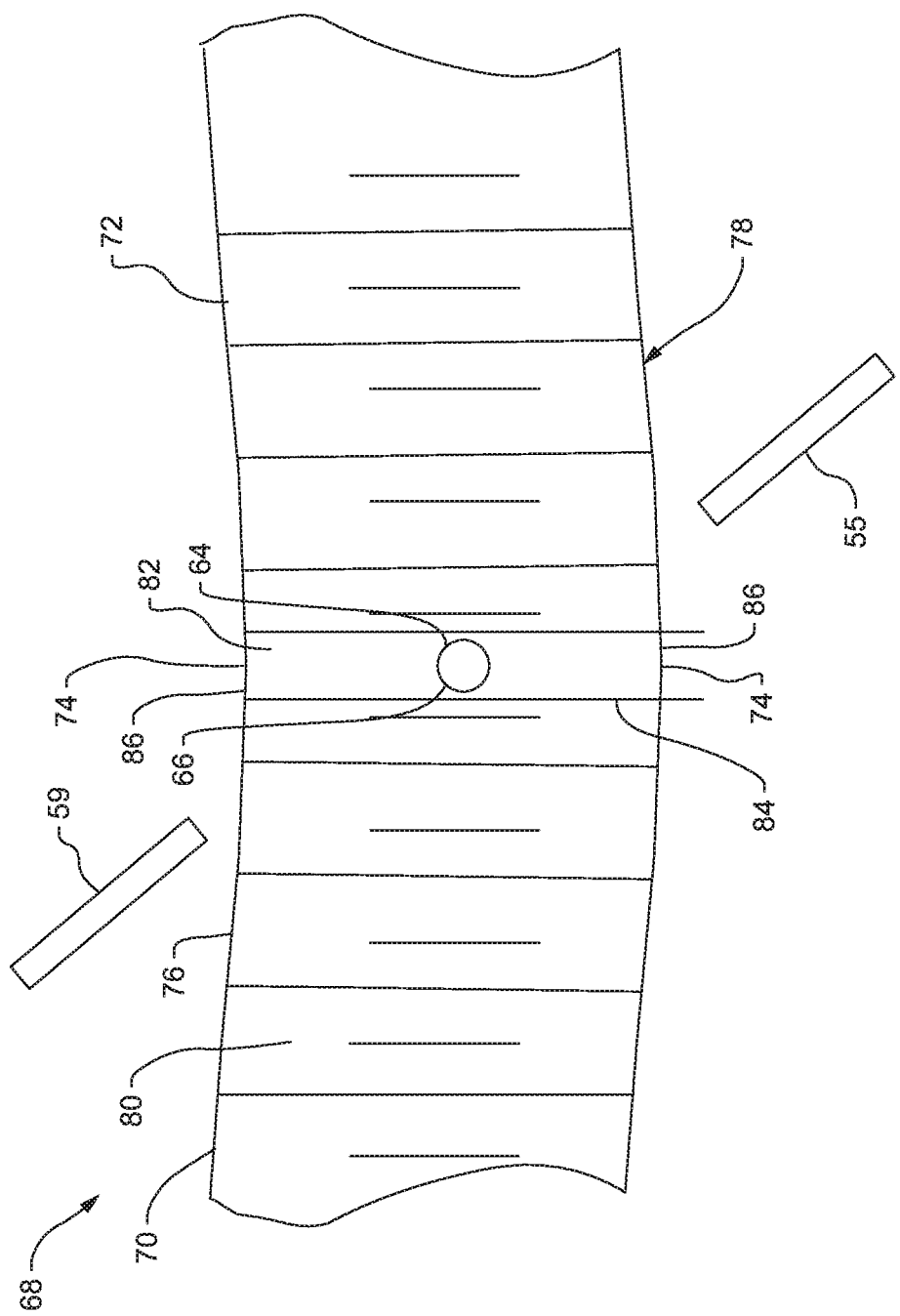
FIG. 6 is a cross-sectional view of a honeycomb structure in accordance with the present disclosure.

FIG. 6 illustrates an embodiment of the present disclosure where a purge gas conduit 64 and purge conduit path 66 is incorporated into an assembled honeycomb structure 68. Similar to the SPF/DB structure 22 described above, the honeycomb structure 68 may include a first honeycomb panel 70 and a second honeycomb panel 72 that are joined together along a weld joint 74. Furthermore, each first and second honeycomb panels 70, 72 may be constructed having a first honeycomb face sheet 76 and a second honeycomb face sheet 78 with a honeycomb panel core 80 formed between the first and second honeycomb face sheets 76, 78. The honeycomb structure 68, as well as the first and second honeycomb panels 70, 72, may be fabricated out of titanium, titanium alloy, or other metal or alloy capable of being welded or otherwise joined together. As described above, titanium, titanium alloy and other metals may adversely react with non-inert gases, reactive gases, and/or other contaminants during the welding process. Therefore, the purge gas conduit 66 may be inserted into the purge conduit path 64 to supply an inert purge gas to the weld joint 74, and adjacent area, before, during, and after the welding process.

The purge conduit path 64 may be formed within the honeycomb panel core 80 and configured to run the length of the weld joint 74 that is formed and/or produced when welding, or otherwise joining, the first and second honeycomb panels 70, 72 together. In some embodiments, the honeycomb panel core 80 may be machined to remove some of the inner structure of the core 80 to create an open area 82. Moreover, the first and second honeycomb panels 70, 72 may have a longitudinal web 84 that is used to help define the open area 82 during the formation of the purge conduit path 64. Additionally or alternatively, the first and second honeycomb face sheets 76, 78 may have one or more extending face sheet portions 86 that extend beyond the honeycomb panel core 80 and may facilitate the formation of the open area 82 between the first and second honeycomb panels 70, 72. In some embodiments, the one or more extending face sheet portions 86 may extend beyond the core 80 and the longitudinal web 84.

Figure 7:
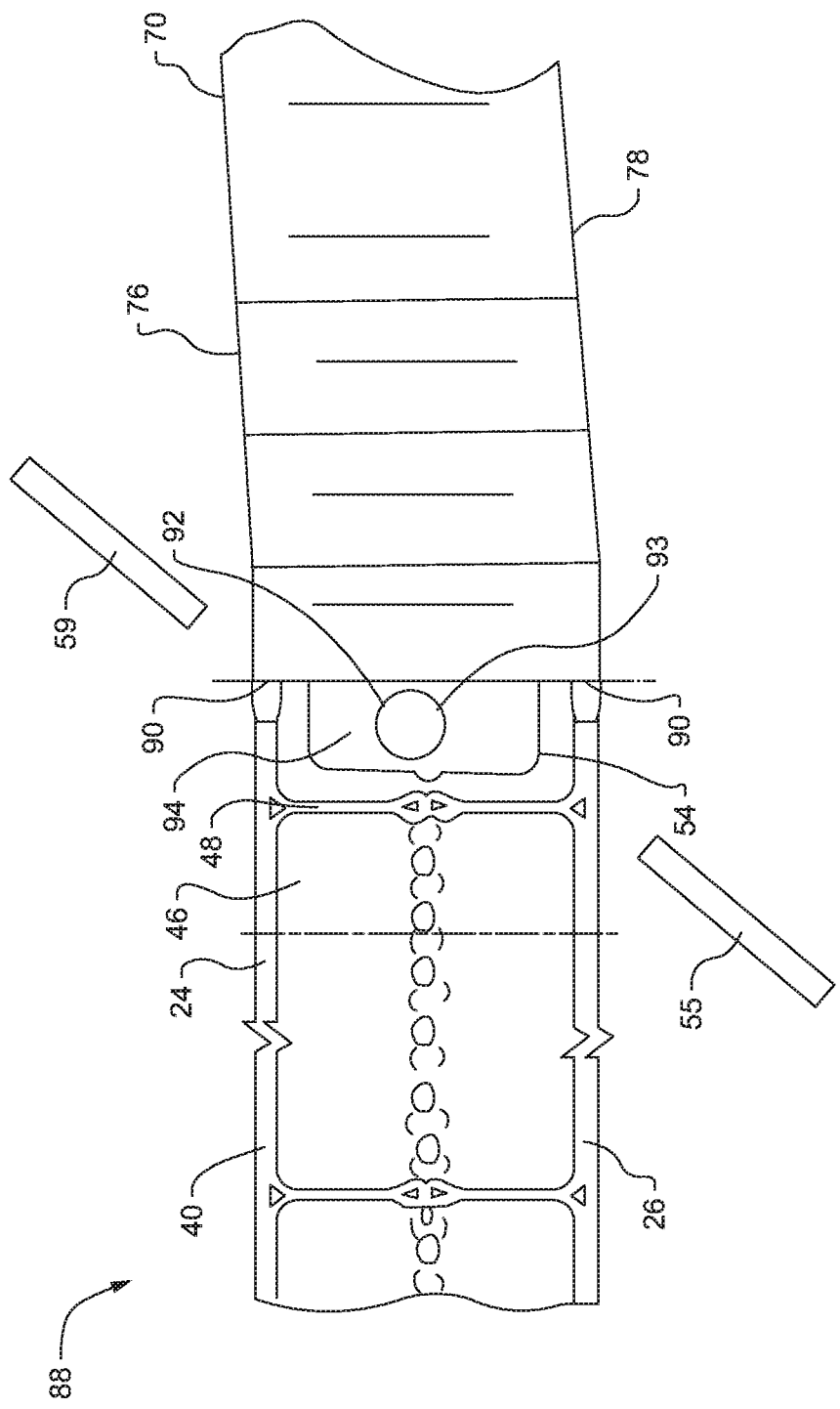
FIG. 7 is a cross-sectional view of a SPF/DB and honeycomb structure in accordance with the present disclosure.

Additionally, one non-limiting example of a hybrid structure 88 is illustrated in FIG. 7. In this embodiment, the hybrid structure 88 may be formed by joining a SPF/DB panel 40 with a honeycomb panel 70, however other combinations are possible. For example, the hybrid structure 88 may be formed by joining a honeycomb panel 70 with an end fitting 62, joining two end fittings 62 together or any other combinations that are consistent with the present disclosure. Furthermore, the SPF/DB panel 40 and the honeycomb panel 70 may be constructed having first and second SPF/DB face sheets 24, 26 and first and second honeycomb face sheets 76, 78. Moreover, the SPF/DB panel 40 may have a core 28 disposed between the SPF/DB first and second face sheets 24, 26 and the core 28 may be composed of one or more transverse webs 46 and one or more longitudinal webs 48. Additionally, the honeycomb panel 70 may have a honeycomb panel core 80 formed between the first and second honeycomb face sheets 76, 78 and the honeycomb panel core 80 may be composed of one or more longitudinal webs 84.

The hybrid structure 88, which includes the SPF/DB panel 40 and the honeycomb panel 70, may be fabricated out of titanium, titanium alloy, or other metal or alloy capable of being welded or otherwise joined together along a weld joint 90. As described above, titanium, titanium alloy and other metals may adversely react with non-inert gases, reactive gases, and/or other contaminants during the welding process. Therefore, an inert purge gas may be supplied to the weld joint 90, and adjacent area through a purge gas conduit 93, before, during, and after the welding process. In some embodiments, the hybrid structure 88 may have a purge conduit path 92 machined, or otherwise formed in an area 94 adjacent to the weld joint 90 and configured to accept the purge gas conduit 93. In some embodiments, the area 94 may be defined by trimming a portion of the transverse web 54 from the SPF/DB panel 24. As a result, when the SPF/DB panel 40 and the honeycomb panel 70 are welded together the area 94 is provided for the purge conduit path 92.

INDUSTRIAL APPLICABILITY

From the forgoing, it can be seen that the teachings of the present disclosure may find industrial application, technical effects and benefits in a wide range of different situations such as fusion welding metals and metal sandwich structures. For most weld joint designs, access to both sides of the joint may provide easy access for supplying a purge gas, such as argon, helium or any known purge gas mixture. Moreover, some weld joint designs may be configured to provide access for visually inspecting the weld quality upon the completion of the weld formation.

However, welding metal sandwich panels, such as SPF/DB panels, honeycomb panels, and the like, may create an increased difficulty in providing access to weld joints. More specifically, the complicated internal core structures of these metal sandwich structures may block the ability to quickly and effectively deliver a purge gas to the area surrounding the weld joints. Additionally, the internal core structure obstructs the view of the weld joints making visual inspection of the weld difficult. The present disclosure provides a weld joint assembly that creates a pathway through the core structure of the metal sandwich panels and allows a purge tube to be positioned adjacent to the weld joints. Furthermore, the purge tube is able to directly deliver the purge gas where it is needed and the purge tube can be configured to follow the contours and tortuous path that may be machined through the metal sandwich panels. As a result, the weld assembly of the present disclosure provides a reliable purge method and inspection pathway to ensure the critical welds are reliably formed and/or produced.

Figure 8:
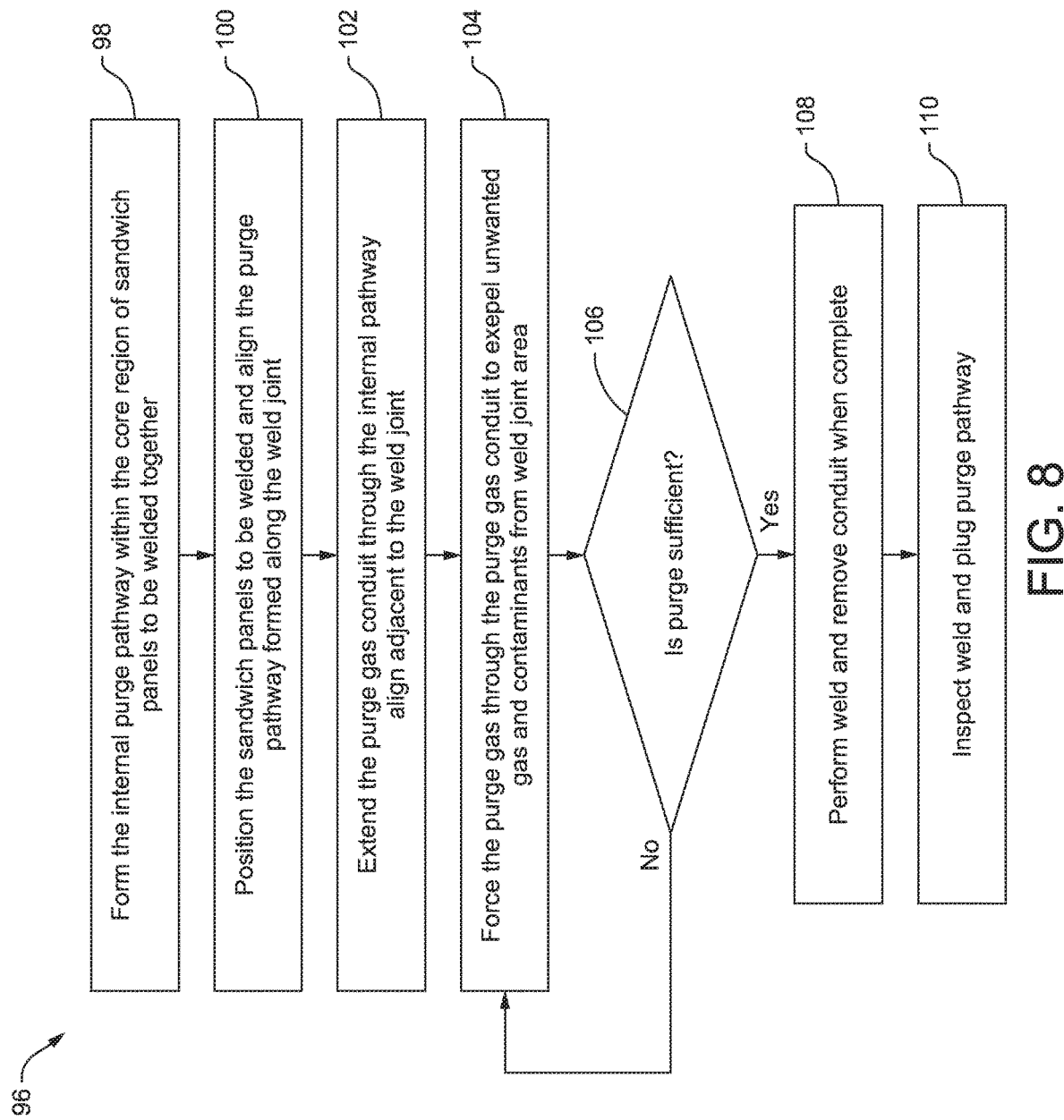
FIG. 8 is a flowchart illustrating an exemplary method of forming a weld in accordance with the present disclosure.

Referring now to FIG. 8 and with reference to the proceeding FIGS. 1-7, a flowchart illustrating an exemplary method or process 96 of forming a weld on a metal sandwich structure 22, 68, 88 is shown. In a first block 98 of the process 96, the internal purge path 50, 68, 92 may be formed within the core region 28, 80 of the metal sandwich structure 22, 68, 88. In accordance with the present disclosure, the metal sandwich structure 22, 68, 88 may be composed of a plurality of SPF/DB panels 40, 42, end fittings, 62, honeycomb panels 70, 72 or any combination thereof. Each SPF/DB panel 40, 42 and honeycomb panel 70, 72 may have an internal core 28, 80 and the internal purge gas conduit pathway 50, 68 may be defined and formed through a portion of the cores 28, 80 of the panels to be welded.

According to the next block 100, once the internal purge gas conduit pathway 50, 68 is created, the SPF/DB panels 40, 42, the honeycomb panels 70, 72 or other panels to be welded, should be aligned such that the internal purge gas conduit pathway 50, 68 is formed along the weld joint 38, 74, 90. Once the purge gas conduit pathway 50, 68 is aligned, process step 102 calls for extending the purge gas conduit 44, 66 through the internal purge gas conduit pathway 50, 68. During execution of block 102 it is important to ensure the purge gas conduit 44, 46 is placed adjacent to the weld joint 38, 74, 90. Once the purge gas conduit 44, 66 is properly placed, the next step 104 may force a purge gas through the purge gas conduit 44, 66. In some embodiments, the purge gas may be an inert gas such as argon, helium or other such gas or mixture thereof. Furthermore, the purge gas may be continuously pushed through the purge gas conduit 44, 66 to expel unwanted contaminants, such as non-inert gases, reactive gases, and other contaminants that may be detrimental to the formation of high quality welds.

Block 106 may incorporate a purge verification to confirm that the unwanted gases in the area surrounding the weld joint 38, 74, 90 have been sufficiently removed. In some embodiments verification may be achieved by incorporating a sensor 59 with the purge gas conduit 44, 66. The sensor 59 may be used to analyze the environment and provide feedback regarding the levels of non-inert or reactive gases in the area surrounding the weld joint 38, 74, 90. In some embodiments, this verification may be important because the presence of non-inert or other reactive gases during welding may be detrimental to the formation of high quality welds. If the levels of non-inert or other reactive gases have not reached satisfactory levels the purge step may continue until the unwanted gas and other contaminants have been expelled from the area surrounding the weld joint 38, 74, 90. Alternatively, verification testing may be performed to arrive at a sufficient purge time to use prior to welding. Such verification testing may be carried out by purging for a specific time and gas flow rate, welding, followed by inspecting and testing the quality of the weld.

In the next block 108, the weld is made to join the plurality of SPF/DB panels 40, 42, end fittings 62, and/or honeycomb panels 70, 72 together to form the desired sandwich panel structure 22, 68, 88. Furthermore, once the welding is complete the purge gas conduit 44, 66 may be removed from the purge gas conduit pathway 50, 68. Moreover, in the next block 110 an inspection may be performed to confirm the weld meets all requirements and specifications. In some embodiments, it may be difficult to visually inspect both sides of the weld because of the complex nature of the core region 28, 80 of the SPF/DB panels 40, 42 and honeycomb panels 70, 72. As a result, the purge gas conduit pathway 50, 68 may be also be used to insert a borescope 55 or other inspection device. This may provide some valuable visual inspection views of the weld which would otherwise not be available due to the obstructed views of the weld. Following the inspection, or if no inspection is required, the purge gas conduit pathway 50, 68 may be covered or otherwise plugged, if necessary.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A method of forming a weld on a work piece, the method comprising:
creating an internal cavity along the work piece;
extending a conduit having an exit orifice into the internal cavity such that the exit orifice is positioned adjacent to the weld to be formed;
supplying a purge gas to the conduit, the purge gas being carried through the conduit and pushed out of the exit orifice so as to displace undesirable gasses away from the weld to be formed; and
forming the weld.

2. The method of claim 1, wherein a first joint member relative to a second joint member being positioned on the work piece so that a first attachment point of the first joint member is aligned with a first attachment point of the second joint member along a first attachment line, and a second attachment point of the first joint member is aligned with a second attachment point of the second joint member along a second attachment line, forming an internal channel within the first and second joint members, aligning the first and second attachment lines with internal channel and the conduit, and forming the weld between the first and second attachment lines.

3. The method of claim 2, wherein the first joint member comprises a first sandwich panel having a first face sheet defining the first attachment point of the first joint member, a second face sheet defining the second attachment point of the first joint member, and an internal cell structure connecting the first face sheet to the second face sheet, the second joint member comprises a second sandwich panel having a first face sheet defining the first attachment point of the second joint member, a second face sheet defining the second attachment point of the second joint member, and an internal cell structure connecting the first face sheet to the second face sheet.

4. The method of claim 2, wherein the exit orifice of the conduit being configured as a plurality of perforations formed along the length of the conduit.

5. The method of claim 2, wherein the internal channel follows a contoured path, and wherein the conduit being formed of a flexible material configured to follow the contoured path.

6. The method of claim 2, further comprising withdrawing the conduit from the internal channel after welding, and inserting an inspection device into the internal channel, the inspection device being configured to inspect the weld quality along the first and second attachment lines.

7. The method of claim 2, wherein the first joint member is one of a SPF/DB structure, a honeycomb structure, or an end fitting and the second joint member is one of a SPF/DB structure, a honeycomb structure, or an end fitting.

8. The method of claim 2, further comprising forming the internal channel by trimming a web of at least one of the first and second joint members.

9. The method of claim 1, wherein supplying the purge gas comprises continuously supplying the purge gas during welding.

10. A weld joint assembly for use with a purge gas conduit, the assembly comprising:
a first joint member including spaced first and second attachment points joined by a web; and
a second joint member including spaced first and second attachment points joined by a web, the second joint member being sized so that the first attachment points of the first and second joint members are aligned along a first attachment line, and the second attachments points of the first and second joint members are aligned along a second attachment line;
the first and second joint members defining an internal channel disposed between, and in direct fluid communication with, the first and second attachment lines, the internal channel extending along entire lengths of the first and second attachment lines, and being sized to receive the purge gas conduit.

11. The weld joint assembly of claim 10, wherein the first joint member comprises a first sandwich panel having a first face sheet defining the first attachment point of the first joint member, a second face sheet defining the second attachment point of the first joint member, and an internal cell structure defining the web of the first joint member, the second joint member comprises a second sandwich panel having a first face sheet defining the first attachment point of the second joint member, a second face sheet defining the second attachment point of the second joint member and an internal cell structure defining the web of the second joint member.

12. The weld joint assembly of claim 10, wherein the internal channel follows a contoured path and the purge gas conduit being formed of a flexible material configured to follow the contoured path.

13. The weld joint assembly of claim 10, wherein the first joint member is one of a SPF/DB structure, a honeycomb structure, or an end fitting and the second joint member is one of a SPF/DB structure, a honeycomb structure, or an end fitting.

14. A weld joint assembly, comprising:
a first joint member including spaced first and second attachment points joined by a first web;
a second joint member including spaced first and second attachment points joined by a second web, the second joint member being sized so that the first attachment points of the first and second joint members are aligned along a first attachment line, and the second attachment points of the first and second joint members are aligned along a second attachment line;
the first and second joint members defining an internal channel disposed between, and in direct fluid communication with, the first and second attachment lines, the internal channel extending along entire lengths of the first and second attachment lines; and
a purge gas conduit sized for insertion into the internal channel.

15. The weld joint assembly of claim 14, wherein the first joint member comprises a first sandwich panel having a first face sheet defining the first attachment point of the first joint member, a second face sheet defining the second attachment point of the first joint member, and an internal cell structure defining the first web of the first joint member, the second joint member comprises a second sandwich panel having a first face sheet defining the first attachment point of the second joint member, a second face sheet defining the second attachment point of the second joint member, and an internal cell structure defining the second web of the second joint member.

16. The weld joint assembly of claim 14, wherein the first joint member being welded to the second joint member along the first and second attachment lines and the purge gas conduit continuously supplying a purge gas during welding.

17. The weld joint assembly of claim 16, wherein the purge gas conduit is configured to continuously supply the purge gas during welding and has a plurality of perforations configured to direct the purge gas towards an area adjacent to the first and second attachment lines prior to and during welding.

18. The weld joint assembly of claim 16, wherein the purge gas conduit being withdrawn from the internal channel after welding, and an inspection device being inserted into the internal channel, the inspection device being configured to inspect the weld quality along the first and second attachment lines.

19. The weld joint assembly of claim 14, wherein the internal channel follows a contoured path and the purge gas conduit being formed of a flexible material configured to follow the contoured path.

20. The weld joint assembly of claim 14, wherein the first joint member is one of a SPF/DB structure, a honeycomb structure, or an end fitting, the second joint member is one of a SPF/DB structure, a honeycomb structure or an end fitting and the internal channel being formed by trimming at least one of the first and second webs.

* * * * *